(12) United States Patent
Marquez et al.

(10) Patent No.: US 8,715,777 B2
(45) Date of Patent: *May 6, 2014

(54) METHOD FOR PRODUCING GLASS SUBSTRATE FOR MAGNETIC DISK AND METHOD FOR PRODUCING MAGNETIC DISK

(75) Inventors: Joseph Marquez, Binan (PH); Elmer Mahia, Binan (PH)

(73) Assignee: Hoya Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/459,337

(22) Filed: Apr. 30, 2012

(65) Prior Publication Data

US 2012/0213921 A1    Aug. 23, 2012

Related U.S. Application Data

(62) Division of application No. 12/088,843, filed as application No. PCT/JP2007/056035 on Mar. 23, 2007.

(60) Provisional application No. 60/785,282, filed on Mar. 24, 2006.

(30) Foreign Application Priority Data

Jun. 30, 2006  (JP) .................................. 2006-182588
Jun. 30, 2006  (JP) .................................. 2006-182690
Jun. 30, 2006  (JP) .................................. 2006-182702
Jun. 30, 2006  (JP) .................................. 2006-182710

(51) Int. Cl.
    *B26D 3/00*    (2006.01)
    *B26D 1/00*    (2006.01)
    *G11B 11/16*   (2006.01)

(52) U.S. Cl.
    USPC .................. 427/129; 83/861; 83/13; 427/130

(58) Field of Classification Search
    None
    See application file for complete search history.

(56) References Cited

U.S. PATENT DOCUMENTS 3,756,104 A * 9/1973 Bier et al. ........................ 83/881
4,671,814 A   6/1987 Aratani et al.
(Continued)

FOREIGN PATENT DOCUMENTS

JP    1-219029     *  9/1989
JP    07-223828    *  8/1995
(Continued)

OTHER PUBLICATIONS

Japanese Office Action dated May 8, 2012 corresponding to Japanese Patent Application No. 2006-182710.

(Continued)

*Primary Examiner* — Mandy Louie
(74) *Attorney, Agent, or Firm* — Sughrue Mion, PLLC

(57) ABSTRACT

In a method in which a cut line is formed on one surface of a planar glass material, and the cut line is allowed to extend in the thickness direction of the glass material, thereby cutting a glass substrate from the glass material, the cut line is selectively formed on a surface having relatively small surface waviness out of two opposing surfaces of the glass material. In the case of a glass material formed into a planar shape on a molten metal, the surface which has come into contact with the molten metal is selected as the surface having relatively small surface waviness. When a disk-shaped glass substrate is cut from the glass material, cutting is performed under conditions where either one of the thickness and the radius of the glass material and the maximum height of surface waviness of the glass material satisfy a predetermined relationship.

17 Claims, 3 Drawing Sheets

(56) References Cited

U.S. PATENT DOCUMENTS

| | | | |
|---|---|---|---|
| 5,654,057 A * | 8/1997 | Kitayama et al. | 428/64.1 |
| 6,537,648 B1 * | 3/2003 | Takahashi et al. | 428/64.1 |
| 2001/0038929 A1 | 11/2001 | Uhlik et al. | |
| 2002/0011079 A1 | 1/2002 | Fujioka | |
| 2003/0110803 A1 * | 6/2003 | Saito et al. | 65/30.14 |
| 2003/0121285 A1 | 7/2003 | Kesuka et al. | |
| 2003/0145624 A1 | 8/2003 | Luettens et al. | |
| 2005/0039342 A1 | 2/2005 | Kirstine | |

FOREIGN PATENT DOCUMENTS

| | | |
|---|---|---|
| JP | 2973354 B2 | 9/1999 |
| JP | 2001-026437 A | 1/2001 |
| JP | 2001-139337 A | 5/2001 |
| JP | 2002-316829 A | 10/2002 |
| JP | 2003-519884 A | 6/2003 |
| JP | 2004-501052 A | 1/2004 |
| JP | 2005-225713 A | 8/2005 |
| JP | 2006-099857 A | 4/2006 |

OTHER PUBLICATIONS

Japanese Office Action dated May 31, 2012 corresponding to Japanese Patent Application No. 2006-182702.
Chinese Office Actions corresponding to Chinese Patent Application No. 200780001228.0, dated Nov. 25, 2010.
Office Action issued on Feb. 19, 2013 from the Japanese Patent Office in a counterpart Japanese Application No. 2006-182710.
Office Action issued on Feb. 19, 2013 from the Japanese Patent Office in a counterpart Japanese Application No. 2006-182702.
Office Action issued on Feb. 19, 2013 from the Japanese Patent Office in a counterpart Japanese Application No. 2006-182690.
Office Action issued on Feb. 19, 2013 from the Japanese Patent Office in a counterpart Japanese Application No. 2006-182588.
Office Action issued in corresponding Japanese Patent Application No. 2006-182690 dated Sep. 10, 2013.

* cited by examiner

METHOD FOR PRODUCING GLASS SUBSTRATE FOR MAGNETIC DISK AND METHOD FOR PRODUCING MAGNETIC DISK

This is a divisional of application Ser. No. 12/088,843 filed Mar. 31, 2008, which is the National Stage Entry of PCT/JP2007/056035 filed on Mar. 23, 2007, as well as the content of U.S. Application 60/785,282 filed Mar. 24, 2006; Japanese Patent Application 2006-182588 filed Jun. 30, 2006; Japanese Patent Application 2006-128690 filed Jun. 30, 2006; Japanese Patent Application 2006-182702 filed Jun. 20, 2006; and Japanese Patent Application 2006-182710 filed Jun. 30, 2006, from which priority has been claimed in the prior application, is considered part of the disclosure of the accompanying Divisional application and is hereby incorporated by reference.

TECHNICAL FIELD

The present invention relates to a method for producing a magnetic disk to be mounted in a magnetic disk device, such as an HDD (hard disk drive), and a method for producing a glass substrate for a magnetic disk.

BACKGROUND ART

Today, in information recording techniques, in particular, magnetic recording techniques, with the rapid development of IT industry, there are increasing demands for technological innovation. In magnetic disks to be mounted in HDDs or the like, due to the requirement for higher capacity, there are demands for a technique that can realize an information recording density of 40 Gbit/inch$^2$ (1 inch being 25.4 mm) or higher.

Recently, glass substrates have been receiving attention as a substrate for a magnetic disk suitable for higher recording density. Glass substrates have higher rigidity than metal substrates, and are thus suitable for allowing an increase in the rotation speed of magnetic disk drives. Furthermore, since a smooth and flat surface can be obtained, the flying height of magnetic heads can be easily decreased. Thus, glass substrates are suitable for improving the S/N ratio of recording signals and for increasing the recording density.

Usually, a glass substrate for a magnetic disk is produced by grinding and polishing the surface of a glass disk having a predetermined size. Here, as the method for forming a glass disk having a predetermined size, for example, a method may be used in which a glass disk is cut from a glass material which has been formed into a planar shape by a float process.

Non-Patent Document 1 listed below describes a planar glass obtained by the float process. Furthermore, Patent Document 1 listed below describes a glass substrate obtained by forming a cut line in a glass plate using a cutter.

Patent Document 2 listed below describes a substrate for an information recording medium using the float process, a production method thereof, etc.

For reference, examples of prior art documents include JP-B-2785906, JP-A-H02-92837, JP-Y-S57-23452, JP-B-S55-6584, JP-B-H05-35095, and JP-B-S55-29019.

Patent Document 1: Japanese Patent Publication JP-B-2973354
Patent Document 2: International Publication WO 02/076675
Non-Patent Document 1: Sumio Sakuhana and two others, "Glass Handbook", 1st ed., 8th printing, Asakura Shoten K.K., Nov. 20, 1985, pp. 412-413.

DISCLOSURE OF INVENTION

Problems to be Solved by the Invention

When a square glass plate or a disk-shaped glass plate is cut out by forming a cut line in a planar glass material formed by a float process, there may be cases in which cutting cannot be performed successfully, or chips, flaws, and cracks occur in the side of the cut glass plate.

Since a glass substrate for a magnetic disk is designed so as to be fit in a narrow housing of a hard disk drive, the thickness of the glass substrate is tightly controlled. Therefore, the planar glass material formed by the float process is a thin plate. Consequently, chips, flaws, and cracks easily occur in the side of the glass plate in the cutting process.

Therefore, in a method for producing glass substrates for magnetic disks, when square glass plates or disk-shaped glass plates are cut out by forming cut lines in a planar glass material formed by the float process, defective products are easily produced, resulting in insufficient production efficiency and prevention of large-scale production, which is a problem.

Recently, since demands for hard disk drives (HDDs) in which magnetic disks are mounted have been rapidly increasing, as compared with before, it is required to establish a production process for glass substrates for magnetic disks such that large-scale production can be achieved. Furthermore, through the improvement in the production efficiency of glass substrates for magnetic disks, it is also required to supply inexpensive glass substrates for magnetic disks so as to meet market needs.

Furthermore, recently, in magnetic disks, there have been requirements for an information recording density of 80 Gbit/inch$^2$ (1 inch being 25.4 mm) or higher. One reason for this relates to the fact that HDDs have been increasingly mounted in personal digital assistants (PDAs), mobile phones, digital cameras, car navigation systems, etc., in addition to conventional needs as storage devices for computers.

In these mobile applications, since the housing space is significantly small compared with computers, it is necessary to reduce the size of HDDs. For that purpose, it is also necessary to decrease the diameter of magnetic disks to be mounted in HDDs. For example, in the computer application, it was possible to use 3.5-inch or 2.5-inch magnetic disks. In the mobile applications, small-diameter magnetic disks having a smaller diameter than the above, for example, a diameter of 0.8 to 1.8 inches, are used.

When glass disks with such a small diameter are cut from the planar glass material, in particular, the defect ratio is high, which is a problem.

Furthermore, even in glass substrates for magnetic disks having a relatively large diameter, such as 2.5 inches, a circular hole formed in the center has a small diameter. Consequently, when glass disks provided with such a circular hole are cut, defective products having a defect particularly in the circular hole portion easily occur, which is also a problem.

Recently, HDDs have been designed so that a Load Unload (hereinafter, referred to as "LUL") method is used for start/stop operations. Compared with the conventional CSS (Contact Start and Stop)-type HDD, in a LUL-type HDD, it is not necessary to provide an uneven shape for CSS on the surface of the magnetic disk, and the surface of the magnetic disk can be extremely flat and smooth. Therefore, the flying height of the magnetic head can be set to be very small. For example, the flying height of the magnetic head is 10 nm or less. Furthermore, in the LUL-type HDD, unlike the conventional CSS-type HDD, it is not necessary to provide a contact sliding region for CSS, and thus the recording/reproducing region can be enlarged in the magnetic disk, which is advantageous. In the LUL method, since the flying height of the magnetic head is set to be very small compared with the conventional method, even if cracks, flaws, and other defects, which have been conventionally tolerated, are present in a magnetic head to be mounted in an HDD or a glass substrate for a magnetic disk, serious faults (e.g., thermal asperity faults) easily occur, which is a problem.

In a method for producing a glass substrate for a magnetic disk, after a glass plate is cut from a glass material, flaws, cracks, and the like are removed by a given process, such as grinding or polishing. However, it is difficult to completely remove them. Consequently, when a glass plate is cut out, it is necessary to reduce as much as possible the occurrence of flaws, cracks, and the like which may cause a failure in the HDD.

Accordingly, it is an object of the present invention to provide a method for producing a glass substrate for a magnetic disk, including a cutting step of cutting a square glass plate or a disk-shaped glass plate from a glass material formed by a float process, and then at least a polishing step, thereby obtaining a high-quality glass substrate for a magnetic disk, free from defects, such as cracks and flaws.

It is a second object of the present invention to provide a method for producing a glass substrate for a magnetic disk including a cutting step in which a square glass plate or a disk-shaped glass plate can be cut with high quality even from a glass material formed into a thin plate by a float process in response to the production of the glass substrate for a magnetic disk.

It is a third object of the present invention to provide a method for producing a glass substrate for a magnetic disk including a cutting step in which a square glass plate or a disk-shaped glass plate can be cut with high quality even from a glass material formed into a thin plate, for example, with a thickness of 1.5 mm or less, in response to the production of the glass substrate for a magnetic disk.

It is a fourth object of the present invention to provide a method for producing a glass substrate for a magnetic disk, including a step of cutting a square glass plate or a disk-shaped glass plate from a glass material formed by a float process, in which excellent production efficiency can be obtained, the method being low-cost and suitable for large-scale production.

It is a fifth object of the present invention to provide a magnetic disk to be mounted in a hard disk drive in which start/stop operations are performed by a Load Unload method and a method for producing a glass substrate suitable for the magnetic disk.

Means for Solving the Problems

The present invention has at least the structures of the invention described below.

(Structure 1 of the Invention)
A method for producing a glass substrate for a magnetic disk including forming a cut line in one surface of a glass material formed into a planar shape on a molten metal; allowing the cut line to extend in the thickness direction of the glass material, thereby cutting a glass plate from the glass material; and making a glass substrate from the cut glass plate, wherein the cut line is formed in a surface of the glass material on the side which has come into contact with the molten metal.

(Structure 2 of the Invention)
A method for producing a glass substrate for a magnetic disk including forming a cut line in one surface of a glass material formed into a planar shape on a molten metal; allowing the cut line to extend in the thickness direction of the glass material, thereby cutting a glass plate from the glass material; and making a glass substrate from the cut glass plate, wherein the cut line is formed in a surface having relatively small surface waviness selected from two opposing surfaces of the glass material.

(Structure 3 of the Invention)
A method for producing a glass substrate for a magnetic disk including forming a cut line in one surface of a glass material formed into a planar shape on a molten metal; allowing the cut line to extend in the thickness direction of the glass material, thereby cutting a glass plate from the glass material; and making a glass substrate from the cut glass plate, wherein the cut line is formed in a surface having a maximum height of surface waviness of 50 nm or less.

(Structure 4 of the Invention)
The method for producing a glass substrate for a magnetic disk according to any one of Structures 1 to 3, wherein a plurality of square glass plates are cut from the glass material.

(Structure 5 of the Invention)
The method for producing a glass substrate for a magnetic disk according to any one of Structures 1 to 3, wherein a cut line is formed in the glass material so as to draw a curve extending along a substantial periphery of a region in which a glass substrate for a magnetic disk is to be formed.

(Structure 6 of the Invention)
A method for producing a magnetic disk including forming at least a magnetic layer on a glass substrate produced by the method for producing a glass substrate for a magnetic disk according to any one of Structures 1 to 5.

(Structure 7 of the Invention)
A method for producing a glass substrate for a magnetic disk including forming a cut line in one surface of a glass material formed into a planar shape; allowing the cut line to extend in the thickness direction of the glass material, thereby cutting a glass plate from the glass material; and making a glass substrate from the cut glass plate, wherein the cut line is formed in a surface having relatively small surface waviness selected from two opposing surfaces of the glass material.

(Structure 8 of the Invention)
A method for producing a glass substrate for a magnetic disk including forming a cut line in one surface of a glass material formed into a planar shape; allowing the cut line to extend in the thickness direction of the glass material, thereby cutting a glass plate from the glass material; and making a glass substrate from the cut glass plate, wherein the cut line is formed in a surface having a maximum height of surface waviness of 50 nm or less.

(Structure 9 of the Invention)
The method for producing a glass substrate for a magnetic disk according to either Structure 7 or 8, wherein a plurality of square glass plates are cut from the glass material.

(Structure 10 of the Invention)
The method for producing a glass substrate for a magnetic disk according to either Structure 7 or 8, wherein a cut line is formed in the glass material so as to draw a curve extending along a substantial periphery of a region in which a glass substrate for a magnetic disk is to be formed.

(Structure 11 of the Invention)
A method for producing a magnetic disk including forming at least a magnetic layer on a glass substrate produced by the method for producing a glass substrate for a magnetic disk according to any one of Structures 7 to 10.

(Structure 12 of the Invention)
A method for producing a glass substrate for a magnetic disk including the step of cutting a disk-shaped glass substrate from a glass material formed into a planar shape on a molten metal, wherein a cut line is formed obliquely with respect to the thickness direction of the glass material, in a principal surface of the glass material on the side which has come into contact with the molten metal, so as to draw a curve extending along a substantial periphery of a region in which a glass substrate for a magnetic disk is to be formed, and then the cut line is allowed to extend, thereby cutting a disk-shaped glass substrate.

(Structure 13 of the Invention)

A method for producing a glass substrate for a magnetic disk including the step of cutting a disk-shaped glass substrate from a glass material formed into a planar shape on a molten metal, wherein the glass substrate for a magnetic disk is provided with a circular hole in the center, and wherein the method includes the step of forming a cut line obliquely with respect to the thickness direction of the glass material, in a principal surface of the glass material on the side which has come into contact with the molten metal, so as to draw a curve extending along a substantial periphery of the inner peripheral side of a region in which a glass substrate for a magnetic disk is to be formed, and allowing the cut line to extend, thereby forming a circular hole in the center of the disk-shaped glass substrate.

(Structure 14 of the Invention)

The method for producing a glass substrate for a magnetic disk according to either Structure 12 or 13, wherein, after the cut line is formed in the principal surface of the glass material, the glass material is heated and/or cooled so that the cut line is allowed to extend toward a principal surface of the glass material opposite the principal surface which has come into contact with the molten metal.

(Structure 15 of the Invention)

The method for producing a glass substrate for a magnetic disk according to any one of Structures 12 to 14, wherein the glass substrate is a glass substrate for a small magnetic disk having a diameter of 65 mm or less.

(Structure 16 of the Invention)

The method for producing a glass substrate for a magnetic disk according to any one of Structures 12 to 15, wherein the glass substrate is a glass substrate used for a magnetic disk to be mounted in a Load Unload-type magnetic disk device.

(Structure 17 of the Invention)

A method for producing a magnetic disk including forming at least a magnetic layer on a glass substrate for a magnetic disk obtained by the production method according to any one of Structures 12 to 16.

(Structure 18 of the Invention)

A method for producing a glass substrate for a magnetic disk including the step of cutting a disk-shaped glass substrate from a planar glass material, wherein a cut line is formed obliquely with respect to the thickness direction of the glass material, in a principal surface having relatively small surface waviness out of two opposing principal surfaces of the glass material, so as to draw a curve extending along a substantial periphery of a region in which a glass substrate for a magnetic disk is to be formed, and then the cut line is allowed to extend, thereby cutting a disk-shaped glass substrate.

(Structure 19 of the Invention)

A method for producing a glass substrate for a magnetic disk including the step of cutting a disk-shaped glass substrate from a planar glass material, wherein the glass substrate for a magnetic disk is provided with a circular hole in the center, and wherein the method includes the step of forming a cut line obliquely with respect to the thickness direction of the glass material, in a principal surface having relatively small surface waviness out of two opposing principal surfaces of the glass material, so as to draw a curve extending along a substantial periphery of the inner peripheral side of a region in which a glass substrate for a magnetic disk is to be formed, and allowing the cut line to extend, thereby forming a circular hole in the center of the disk-shaped glass substrate.

(Structure 20 of the Invention)

The method for producing a glass substrate for a magnetic disk according to either Structure 18 or 19, wherein, after the cut line is formed in the principal surface of the glass material, the glass material is heated and/or cooled so that the cut line is allowed to extend toward a principal surface of the glass material opposite the principal surface having relatively small surface waviness.

(Structure 21 of the Invention)

The method for producing a glass substrate for a magnetic disk according to any one of Structures 18 to 20, wherein the glass substrate is a glass substrate for a small magnetic disk having a diameter of 65 mm or less.

(Structure 22 of the Invention)

The method for producing a glass substrate for a magnetic disk according to any one of Structures 18 to 21, wherein the glass substrate is a glass substrate used for a magnetic disk to be mounted in a Load Unload-type magnetic disk device.

(Structure 23 of the Invention)

A method for producing a magnetic disk including forming at least a magnetic layer on a glass substrate for a magnetic disk obtained by the method for producing a glass substrate for a magnetic disk according to any one of Structures 18 to 22.

(Structure 24 of the Invention)

A method for producing a glass substrate for a magnetic disk including forming a cut line in one surface of a planar glass material so as to draw a curve extending along a substantial periphery of a region in which a glass substrate for a magnetic disk is to be formed; allowing the cut line to extend in the thickness direction of the glass material, thereby cutting a disk-shaped glass plate; and making a glass substrate from the cut glass plate, wherein, when the cut line in a circular shape is formed in the glass material and then cutting is performed, the cutting is performed under the conditions where the radius of the circle (r [mm]) and the maximum height of surface waviness (PV [nm]) of the glass material satisfy a predetermined relationship.

(Structure 25 of the Invention)

The method for producing a glass substrate for a magnetic disk according to Structure 24, wherein the predetermined relationship is PV 5×r.

(Structure 26 of the Invention)

A method for producing a glass substrate for a magnetic disk including forming a cut line in one surface of a planar glass material so as to draw a curve extending along a substantial periphery of a region in which a glass substrate for a magnetic disk is to be formed; allowing the cut line to extend in the thickness direction of the glass material, thereby cutting a disk-shaped glass plate; and making a glass substrate from the cut glass plate, wherein, when a circle with a radius of 10 mm or less is cut out by forming a cut line, the cut line is formed in a surface having relatively small surface waviness selected from two opposing surfaces of the glass material.

(Structure 27 of the Invention)

The method for producing a glass substrate for a magnetic disk according to Structure 26, wherein, when a circle with a radius of 10 mm is cut out by forming a cut line, the cut line is formed in a surface with a maximum height of surface waviness of 50 nm or less.

(Structure 28 of the Invention)

A method for producing a glass substrate for a magnetic disk including forming a cut line in one surface of a planar glass material so as to draw a curve extending along a substantial periphery of a region in which a glass substrate for a magnetic disk is to be formed; allowing the cut line to extend in the thickness direction of the glass material, thereby cutting a disk-shaped glass plate; and making a glass substrate from the cut glass plate, wherein, when a circle with a predetermined radius or less is cut out by forming a cut line, the maximum height of surface waviness of the glass material is measured, a glass material having a predetermined maximum height of surface waviness or less is selected, and then the circle is cut out.

(Structure 29 of the Invention)

The method for producing a glass substrate for a magnetic disk according to Structure 28, wherein a glass material satisfying the relationship PV 5×r is selected, wherein r [nm] is the radius of the circle, and PV [nm] is the maximum height of surface waviness.

(Structure 30 of the Invention)

The method for producing a glass substrate for a magnetic disk according to any one of Structures 24 to 29, wherein the cut line is formed so as to incline with respect to the thickness direction of the glass material and so as to draw a closed curve.

(Structure 31 of the Invention)

A method for producing a magnetic disk including forming at least a magnetic layer on a glass substrate produced by the method for producing a glass substrate for a magnetic disk according to any one of Structures 24 to 30.

(Structure 32 of the Invention)

A method for producing a glass substrate for a magnetic disk including forming a cut line in one surface of a planar glass material so as to draw a curve extending along a substantial periphery of a region in which a glass substrate for a magnetic disk is to be formed; allowing the cut line to extend in the thickness direction of the glass material, thereby cutting a disk-shaped glass plate; and making a glass substrate from the cut glass plate, wherein, when at least an inner hole of the disk-shaped glass plate is formed, the cut line is formed in a surface having relatively small surface waviness selected from two opposing surfaces of the glass material.

(Structure 33 of the Invention)

A method for producing a glass substrate for a magnetic disk including forming a cut line in one surface of a planar glass material so as to draw a curve extending along a substantial periphery of a region in which a glass substrate for a magnetic disk is to be formed; allowing the cut line to extend in the thickness direction of the glass material, thereby cutting a disk-shaped glass plate; and making a glass substrate from the cut glass plate, wherein, when at least an inner hole of the disk-shaped glass plate is formed, the cut line is formed in a surface with a maximum height of surface waviness of 50 nm or less.

(Structure 34 of the Invention)

The method for producing a glass substrate for a magnetic disk according to Structure 32 or 33, wherein, after the cut line is formed in the surface of the glass material, the glass material is heated and/or cooled so that the cut line is allowed to extend.

(Structure 35 of the Invention)

The method for producing a glass substrate for a magnetic disk according to any one of Structures 32 to 34, wherein the glass substrate is a glass substrate used for a magnetic disk to be mounted in a Load Unload-type magnetic disk device.

(Structure 36 of the Invention)

A method for producing a glass substrate for a magnetic disk including forming a cut line in one surface of a planar glass material so as to draw a curve extending along a substantial periphery of a region in which a glass substrate for a magnetic disk is to be formed; allowing the cut line to extend in the thickness direction of the glass material, thereby cutting a disk-shaped glass plate; and making a glass substrate from the cut glass plate, wherein cutting is performed under the conditions where the thickness (t [mm]) of the glass material and the maximum height of surface waviness (PV [nm]) of the glass material satisfy a predetermined relationship.

(Structure 37 of the Invention)

The method for producing a glass substrate for a magnetic disk according to Structure 36, wherein the predetermined relationship is PV≤50t.

(Structure 38 of the Invention)

A method for producing a glass substrate for a magnetic disk including forming a cut line in one surface of a planar glass material so as to draw a curve extending along a substantial periphery of a region in which a glass substrate for a magnetic disk is to be formed; allowing the cut line to extend in the thickness direction of the glass material, thereby cutting a disk-shaped glass plate; and making a glass substrate from the cut glass plate, wherein, when the disk-shaped glass plate is cut from a glass material with a thickness of 1 mm or less, the cut line is formed in a surface having relatively small surface waviness selected from two opposing surfaces of the glass material.

(Structure 39 of the Invention)

The method for producing a glass substrate for a magnetic disk according to Structure 38, wherein, when the disk-shaped glass plate is cut from a glass material with a thickness of 1 mm, the cut line is formed in a surface with a maximum height of surface waviness of 50 nm or less.

(Structure 40 of the Invention)

A method for producing a glass substrate for a magnetic disk including forming a cut line in one surface of a planar glass material so as to draw a curve extending along a substantial periphery of a region in which a glass substrate for a magnetic disk is to be formed; allowing the cut line to extend in the thickness direction of the glass material, thereby cutting a disk-shaped glass plate; and making a glass substrate from the cut glass plate, wherein, when a glass material with a predetermined thickness of less is cut, the maximum height of surface waviness of the glass material is measured, a glass material having a predetermined maximum height of surface waviness or less is selected, and then the cut line is formed.

(Structure 41 of the Invention)

The method for producing a glass substrate for a magnetic disk according to Structure 40, wherein a glass material satisfying the relationship PV≤50t is selected, wherein t [mm] is the thickness, and PV [nm] is the maximum height of surface waviness.

(Structure 42 of the Invention)

The method for producing a glass substrate for a magnetic disk according to any one of Structures 36 to 41, wherein the cut line is formed so as to incline with respect to the thickness direction of the glass material and so as to draw a closed curve.

(Structure 43 of the Invention)

A method for producing a magnetic disk including forming at least a magnetic layer on a glass substrate produced by the method for producing a glass substrate for a magnetic disk according to any one of Structures 36 to 41.

(Structure 44 of the Invention)

A method for producing a glass substrate for a magnetic disk including forming a cut line in one surface of a planar glass material so as to draw a curve extending along a substantial periphery of a region in which a glass substrate for a magnetic disk is to be formed; allowing the cut line to extend in the thickness direction of the glass material, thereby cutting a disk-shaped glass plate; and making a glass substrate from the cut glass plate, wherein, when the disk-shaped glass plate is cut from a glass material with a thickness of 1.5 mm or less, the cut line is formed in a surface having relatively small surface waviness selected from two opposing surfaces of the glass material, and after the cut line is formed, the cut line is allowed to extend by heating and/or cooling the glass material.

(Structure 45 of the Invention)

A method for producing a glass substrate for a magnetic disk including forming a cut line in one surface of a planar glass material so as to draw a curve extending along a substantial periphery of a region in which a glass substrate for a magnetic disk is to be formed; allowing the cut line to extend in the thickness direction of the glass material, thereby cutting a disk-shaped glass plate; and making a glass substrate from the cut glass plate, wherein, when the disk-shaped glass plate is cut from a glass material with a thickness of 1.5 mm or less, the cut line is formed in a surface with a maximum height of surface waviness of 50 nm or less, and after the cut line is formed, the cut line is allowed to extend by heating and/or cooling the glass material.

(Structure 46 of the Invention)

The method for producing a glass substrate for a magnetic disk according to Structure 44 or 45, wherein the glass substrate is a glass substrate used for a magnetic disk to be mounted in a Load Unload-type magnetic disk device.

Advantages of the Invention

According to the present invention, it is possible to obtain a high-quality glass substrate for a magnetic disk in which no defects, such as chips, cracks, and flaws, are present in the portion cut after being provided with a cut line; to realize a method for producing a glass substrate for a magnetic disk suitable for large-scale production by improving production efficiency; and to obtain a method for producing a magnetic disk in which the cost of a glass substrate for the magnetic disk can be reduced. Furthermore, since defects, such as chips, cracks, and flaws, do not occur in a glass substrate for a magnetic disk, it is possible to suitably produce, from the glass substrate for a magnetic disk, a magnetic disk to be mounted in a hard disk drive which starts and stops by a Load Unload method and a glass substrate for a magnetic disk used for the magnetic disk.

Figure 1:
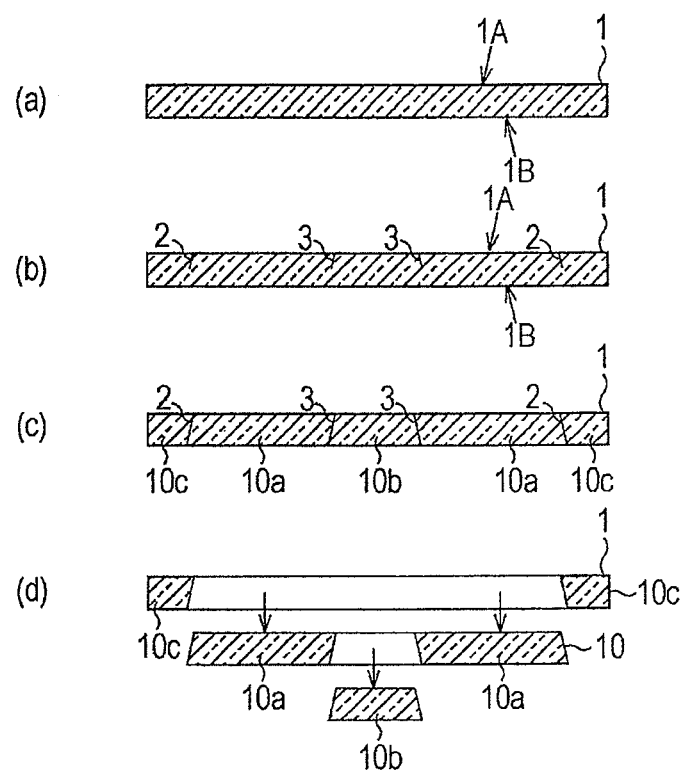
FIG. 1 is a cross-sectional view showing the steps of cutting a disk-shaped glass plate from a planar glass according to the present invention.

| Reference Numerals | |
|---|---|
| 1 | planar glass |
| 2, 3 | cut line |
| 10 | disk-shaped glass plate (disk-shaped glass substrate) |

BEST MODES FOR CARRYING OUT THE INVENTION

According to this embodiment, a cut line is formed in one surface of a glass material formed into a thin plate, for example, with a thickness of 1.5 mm or less, in response to the production of a glass substrate for a magnetic disk. As such a glass material in the shape of a thin plate, a glass material formed by a float process is preferably used. The glass plate is a thin plate, preferably with a thickness of 1.5 mm or less, particularly preferably 1.4 mm or less, and more preferably 1.3 mm or less. Still more preferably, the glass plate is a thin plate with a thickness of 1.2 mm or less. Most preferably, a thin plate with a thickness of 1.1 mm or less, in particular, 1.0 mm or less can be used.

In this embodiment, the term "surface waviness" means a three-dimensional surface shape formed on a surface of a glass material. The surface waviness can be grasped by observing a predetermined region of the glass material with a microscope or the like.

In this embodiment, the surface waviness can be a surface shape formed on a surface of a glass material and constructed by selecting a shape having a shape wavelength in the range of 0.1 to 5 mm.

As the predetermined region in which the surface waviness is to be observed, for example, any region of 1,837 mm$^2$ in a planar material can be selected.

As the predetermined region in which the surface waviness is to be observed, for example, a toroidal region with an inner radius of 16 mm and an outer radius of 29 mm can be selected.

Furthermore, as a device for observing such surface waviness, an Optiflat manufactured by Phase Shift Technology Inc. may be preferably used.

Furthermore, in this embodiment, the average height of surface waviness may be referred to as Wa. The average height of surface waviness (Wa) represents an arithmetic mean roughness of the surface waviness shape. Furthermore, in this embodiment, the maximum height of surface waviness may be referred to as PV. The maximum height of surface waviness (PV) is a value obtained by calculating an average plane of the surface waviness shape, and adding the absolute value of the height of the highest peak with respect to the average plane and the absolute value of the depth of the lowest valley with respect to the average plane.

The present inventors have found that, in the case of a planar glass base plate formed by a float process, the planar glass base plate has a surface (bottom surface) which has come into contact with molten tin and a surface (top surface) opposite thereto, and there is a difference in the quality of the glass plate which has been subjected to cutting between the case where a cut line is made in the bottom surface and then cutting is performed and the case where a cut line is made in the top surface and then cutting is performed. In particular, it has been found that, in the case of a glass material formed into a thin plate in response to the production of a glass substrate for a magnetic disk, there is a significant difference in the quality of the glass plate which has been subjected to cutting between the case where a cut line is made in the bottom surface and then cutting is performed and the case where a cut line is made in the top surface and then cutting is performed. In the production of a glass substrate for a magnetic disk, it is preferable to select the bottom surface and make a cut line therein.

The present inventors have examined the difference between the top surface and the bottom surface. As a result, it has been found that there is a difference in the shape of surface waviness in a certain shape wavelength range. When the top surface and the bottom surface are compared to each other, it has been found that the surface waviness shape of the top surface is relatively large, and the surface waviness shape of the bottom surface is relatively small. When a glass substrate for a magnetic disk is produced, it is preferable to select a surface whose surface waviness shape is relatively small and to form a cut line in the selected surface.

Furthermore, when a cut line is formed in a glass material formed into a planar shape and a glass plate is cut out, it is preferable to form a cut line in a surface having a maximum height of surface waviness (PV) of 50 nm or less.

Furthermore, when a cut line is formed in a glass material formed into a planar shape and a glass plate is cut out, it is preferable to form a cut line in a surface having an average height of surface waviness (Wa) of 5 nm or less.

Furthermore, when a cut line is formed in a glass material, the depth of the cut line is preferably in a range of 50% to 85% of the thickness of the glass material. When the cut line is actually formed, the force for pressing a cutter blade is preferably set such that the depth of the cut line is in a range of 50% to 85% of the thickness of the glass material.

When the depth of the cut line is smaller than 50% of the thickness or larger than 85% of the thickness, there is a possibility that cracks and chips may occur when the glass plate is cut out (cut) from the glass material. Consequently, in order to prevent defective products with cracks, chips, fractures, and the like from occurring, it is preferable to set the depth of a cut line formed when a glass plate is cut from a glass material in a range of 50% to 85% of the thickness of the glass material.

In this embodiment, a particularly preferable glass substrate is composed of an amorphous glass and an aluminosilicate glass. Among aluminosilicate glasses, a glass substrate containing an alkali metal element is more preferable. For example, a glass that contains $SiO_2$ and $Al_2O_3$ and further contains $Na_2O$ can sufficiently show the effect of this embodiment. A glass containing $Li_2O$ can also be preferably used. For example, a glass for chemically strengthening processing is preferable in this embodiment.

As such a glass, a glass containing, as principal components, 58% to 75% by weight of $SiO_2$, 5% to 23% by weight of $Al_2O_3$, 3% to 10% by weight of $Li_2O$, and 4% to 13% by weight of $Na_2O$ is preferable.

An example of a particularly preferable glass is an aluminosilicate glass which contains as principal components, 62% to 75% by weight of $SiO_2$, 5% to 15% by weight of $Al_2O_3$, 4% to 10% by weight of $Li_2O$, 4% to 12% by weight of $Na_2O$, and 5.5% to 15% by weight of $ZrO$ and in which the weight ratio of $Na_2O/ZrO_2$ is 0.5 to 2.0 and the weight ratio of $Al_2O_3/ZrO_2$ is 0.4 to 2.5.

Another example of a preferable glass is an aluminosilicate glass containing, in terms of percent by weight, 61% to 70% of $SiO_2$, 9% to 18% of $Al_2O_3$, 2% to 3.9% of $Li_2O$, 6% to 13% of $Na_2O$, 0% to 5% of $K_2O$, 10% to 16% of $R_2O$ (wherein $R_2O=Li_2O+Na_2O+K_2O$), 0% to 3.5% of $MgO$, 1% to 7% of $CaO$, 0% to 2% of $SrO$, 0% to 2% of $BaO$, 2% to 10% of $RO$ (wherein $RO=MgO+CaO+SrO+BaO$), 0% to 2% of $TiO_2$, 0% to 2% of $CeO_2$, 0% to 2% of $Fe_2O_3$, and 0% to 1% of $MnO$, wherein $TiO_2+CeO_2+Fe_2O_3+MnO=0.01\%$ to 3%.

This embodiment may include a first cutting process of cutting a plurality of square glass plates from a planar glass material, and a second cutting process of cutting disk-shaped glass plates from the square glass plates. In such a case, preferably, the present invention is used in at least one of the first cutting process and the second cutting process. Particularly preferably, the present invention is used in the first cutting process and the second cutting process.

A preferred embodiment with respect to a process of producing a disk-shaped glass plate using a planar glass material or a square glass plate will be described below in more details. In the explanation below, a disk-shaped glass plate is described as a disk-shaped substrate.

FIG. 1 is a cross-sectional view showing the steps of cutting out a disk-shaped glass plate according to the present invention.

A method for producing a glass substrate for a magnetic disk according to this embodiment includes a step of cutting a disk-shaped glass substrate from a glass material formed into a planar shape on a molten metal (i.e., cutting step). In the cutting step, a cut line is formed in the glass material so as to draw a curve extending along a substantial periphery of a region in which a glass substrate for a magnetic disk is to be formed, and then the cut line is allowed to extend so that the disk-shaped glass substrate is cut.

FIG. 1(a) is a cross-sectional view of a planar glass 1. As the planar glass, a glass material formed into a planar shape can be used. Alternatively, a glass plate cut into a square shape from a planar glass material may be used.

In the case of a planar glass material formed by a float process, since molten glass is formed into a planar shape on a molten metal, it is possible to distinguish a principal surface (hereinafter referred to as the "bottom surface") which has come into contact with the molten metal (generally, molten tin) in the production step from a principal surface (hereinafter referred to as the "top surface") opposite the bottom surface. In the case of the planar glass 1 shown in FIG. 1(a), the upper principal surface corresponds to a bottom surface 1A, and the lower principal surface corresponds to a top surface 1B. Note that a metal diffusion layer with a thickness of about 10 to 50 μm is inevitably formed on the bottom surface 1A side. On the other hand, although the molten metal is not directly brought into contact with the top surface 1B side in the production step, in some cases, the metal vaporized into the atmosphere may permeate into the top surface 1B side to form a metal diffusion layer. However, even if a metal diffusion layer is formed on the top surface 1B side, the thickness thereof is at most about several micrometers.

Figure 2:
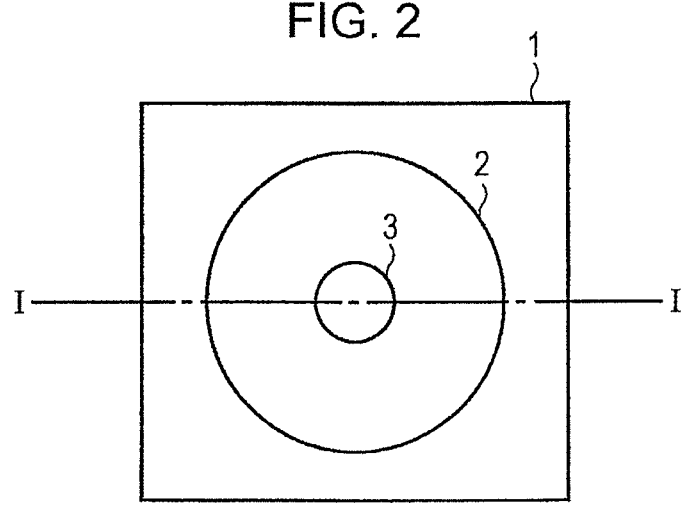
FIG. 2 is a plan view showing a state in which cut lines are formed on a principal surface of a planar glass.

A cut line is formed in the bottom surface 1A of the planar glass 1 so as to draw a curve extending along a substantial periphery of a region in which a glass substrate for a magnetic disk is to be formed. In this embodiment, as shown in FIGS. 1(b) and 2, circular cut lines 2 and 3 are formed so as to extend along a substantial periphery of the outer peripheral side of the region for forming a glass substrate for a magnetic disk and a substantial periphery of the inner peripheral side, respectively, in the bottom surface 1A of the planar glass 1, using a glass cutter. FIG. 2 is a plan view showing a state in which the cut lines are formed on the bottom surface of the planar glass 1, and FIG. 1(b) is a cross-sectional view taken along the line I-I of FIG. 2.

In this case, each of the outer peripheral side cut line 2 and the inner peripheral side cut line 3 is formed obliquely with respect to the thickness direction. Furthermore, in this embodiment, the cut lines 2 and 3 are formed so as to incline outward from the bottom surface 1A to the top surface 1B of the planar glass 1. In the cross-sectional view of FIG. 1(*b*), the left and right cut lines 2 and the left and right cut lines 3 each are formed so as to correspond to sides of a truncated pyramid. By forming a cut line obliquely with respect to the thickness direction in the bottom surface of the planar glass obtained by the float process, when the cut line is allowed to extend and an inner portion surrounded by the cut line is removed, it is possible to stably obtain a high-quality glass disk free from defects, such as chips, cracks, and flaws, even in the part cut following the formed cut line.

Figure 3:
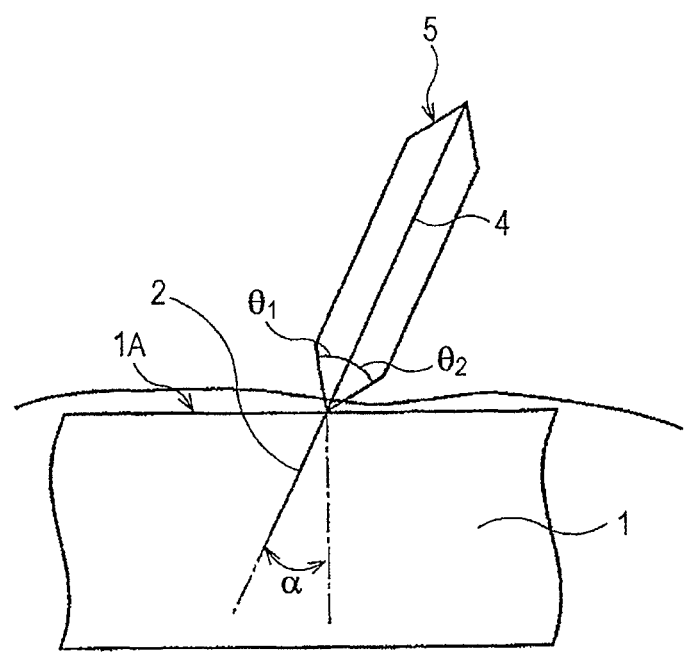
FIG. 3 is an enlarged cross-sectional view showing a state in which a cut line is formed on a principal surface of a planar glass together with a cutter.

FIG. 3 is an enlarged cross-sectional view showing a state in which a cut line is formed. When a cut line is formed obliquely, although the inclination angle is not particularly limited, preferably, the angle α between the cut line and a direction orthogonal to a bottom surface 1A (refer to FIG. 3) is set, for example, in a range of about 5 to 45 degrees.

Furthermore, as the glass cutter used for forming such an oblique cut line, for example, a wheel cutter is preferably used, and a diamond cutter can be used. In such a case, it may be possible to use a cutter in which the left edge angle and the right edge angle are different with respect to the cutter ridge. Alternatively, using a cutter in which the left edge angle and the right edge angle are the same, the cutter may be inclined at a certain contact angle relative to the planar glass surface.

That is, as shown in FIG. 3, as the method for forming a cut line 2 that inclines with respect to the thickness direction of the planar glass 1, in a first method, using a cutter 5 in which the left edge angle θ1 and the right edge angle θ2 are the same with respect to a cutter ridge 4, the cutter 5 is relatively moved with the cutter ridge 4 of the cutter 5 being inclined by the angle α with respect to the bottom surface 1A of the planar glass 1, and in a second method, using a cutter (not shown) in which the left edge angle θ1 and the right edge angle θ2 are different with respect to a cutter ridge 4, the cutter is relatively moved with the cutter ridge 4 of the cutter being perpendicular to the bottom surface 1A of the planar glass 1.

Furthermore, after the glass disk is cut out, grinding and polishing are performed so as to obtain a predetermined outer diameter and inner diameter. Therefore, the size (diameter) of each of the circular cut lines 2 and 3, which extend along a substantial periphery of the outer peripheral side of the region for forming a glass substrate for a magnetic disk and a substantial periphery of the inner peripheral side, respectively, are preferably determined in consideration of the grinding and polishing margin.

Next as shown in FIG. 1(*c*), the cut lines 2 and 3 formed in the bottom surface 1A of the planar glass 1 are allowed to extend toward the top surface 1B side. Thereby, an inner region 10*a* surrounded by the cut line 2 is separated from the planar glass 1. Furthermore, an inner portion 10*b* surrounded by the cut line 3 is separated from the region 10*a* surrounded by the cut line 2.

As the means for allowing the cut lines 2 and 3 formed in the bottom surface 1A of the planar glass 1 toward the top surface 1B side as described above, a means for causing a thermal expansion difference, for example, heating and/or cooling the planar glass 1 may be preferably mentioned. By heating and/or cooling the planar glass 1, a thermal expansion difference is caused in the thickness direction of the planar glass 1, and the planar glass 1 is deformed convexly upward or downward. This deformation allows the cut lines 2 and 3 to reach the top surface 1B in an instant.

When the planar glass 1 is heated or cooled, although the entire planar glass 1 may be heated or cooled using a heating device, such as an oven, or a cooling device, preferably, in particular, one side of the planar glass 1 is heated or cooled. The reason for this is that by heating or cooling the one side of the planar glass 1, extension of the cut lines can be performed more reliably. In such a case, the one side of the planar glass 1 may be entirely heated or cooled, or the one side may be partially heated or cooled. For example, when the one side of the planar glass 1 is entirely heated or cooled, preferably, the bottom surface 1A side on which the cut lines 2 and 3 are formed is heated, or the top surface 1B side opposite the bottom surface on which the cut lines 2 and 3 are formed is cooled. Furthermore, when the one side of the planar glass 1 is partially heated or cooled, preferably, the region outside the cut line is heated, or the region inside the cut line is cooled.

Next, as shown in FIG. 1(*d*), using an appropriate means, such as a pushing rod, the inner regions 10*a* and 10*b* surrounded by the cut line 2 are pushed out downward, and then the region 10*b* surrounded by the cut line 3 is pushed out. Thereby, a glass disk (disk-shaped glass substrate) 10 provided with a circular hole in the center is obtained.

In this embodiment, firstly, the cut lines 2 and 3 are formed so as to extend along a substantial periphery of the outer peripheral side of the region in which a glass substrate for a magnetic disk is to be formed and a substantial periphery of the inner peripheral side, respectively, in the bottom surface 1A of the planar glass 1, and then the cut lines are allowed to extend to the top surface 1B side, thereby obtaining the glass disk 10. However, the method is not limited thereto. It may be possible to use a method in which firstly, a cut line 2 for the outer periphery is formed, the cut line 2 is allowed to extend, the entire inner region surrounded by the cut line 2 is cut from the planar glass 1, a cut line 3 for the inner periphery is formed in the cut glass disk, the cut line 3 is allowed to extend, and a circular hole surrounded by the cut line 3 is formed, thereby obtaining the glass disk 10.

In the case of a glass substrate for a small magnetic disk having an outer diameter of 65 mm or less, the inner diameter is very small at 20 mm or less. According to this embodiment, it is possible to stably produce a glass substrate for a magnetic disk by cutting a glass disk having a circular hole with such a small diameter in the center from a planar glass, resulting in an increase in yield.

Furthermore, in this embodiment, the cut lines 2 and 3 are formed so as to incline outward from the bottom surface 1A of the planar glass 1 toward the top surface 1B side. However, the method is not limited thereto. For example, a method may be used in which cut lines 2 and 3 are formed so as to incline inward from the bottom surface 1A of the planar glass 1 toward the top surface 1B side, such that in a cross-sectional view as that shown in FIG. 1(*b*), the left and right cut lines 2 and the left and right cut lines 3 each are formed so as to correspond to sides of a truncated inverse pyramid, the cut lines are allowed to extend, and the inner portions surrounded by the cut lines are taken out upward.

Furthermore, in this embodiment, the cut line is a closed curve extending along a substantial periphery of a region in which a glass substrate for a magnetic disk is to be formed. However, the cut line may not be a completely closed curve. For example, even in the case where the start point of a cut line and the end point slightly deviate from each other, it is possible to allow the cut line to extend and to cut out a disk-shaped glass substrate. Furthermore, the cut line may not be a continuous curve. For example, it may be possible to use a method in which a cut line is formed in the shape of a broken line so as to extend along a substantial periphery of a region in which a glass substrate for a magnetic disk is to be formed, the cut line is allowed to extend, and a disk-shaped substrate is cut out.

In order to achieve a higher recording density of a magnetic disk, it is necessary to improve the smoothness of the surface of a glass substrate. A glass substrate for a magnetic disk is produced by grinding and polishing the surface of a glass disk 10 with a predetermined size cut from a planar glass obtained by the float process as described above. Usually, the grinding step is performed using a lapping apparatus, and in order to improve the dimensional accuracy and form accuracy of the glass disk 10, abrasive grains having a predetermined grain size are used. Furthermore, the polishing step is performed using a polishing apparatus. In a preferred embodiment, a first polishing step and a second polishing step are carried out. In the first polishing step, in order to remove flaws and strain remaining from the grinding step, the surface of the glass substrate is polished using a hard polisher as the polisher, and in the second polishing step, in order to perform finishing to obtain a smoother mirror-like surface while maintaining the flat surface obtained in the first polishing step, the surface of the glass disk is polished using a soft polisher in place of the hard polisher.

Furthermore, the glass substrate which has undergone the polishing step may be subjected to chemically strengthening. In particular, when the type of glass used is an aluminosilicate glass, by performing chemically strengthening, the flexural strength is increased, the depth of a compressive stress layer is increased, and excellent Knoop hardness is obtained. The method for chemical strengthening is not particularly limited, and any conventionally known method may be used. From a practical point of view, chemical strengthening by a low-temperature ion exchange method is preferable.

Furthermore, a texture for imparting magnetic anisotropy to a magnetic layer to be formed on the glass substrate may be formed on the principal surface of the glass substrate. One example of the method for forming such a texture is a method using tape polishing, in which a tape is pressed against the principal surface of the glass substrate, and by relatively moving the glass substrate and the tape with a polishing solution being supplied, a circumferential texture can be formed on the principal surface of the glass substrate.

In this embodiment, although the diameter of the glass substrate for a magnetic disk is not particularly limited, a more significant effect is shown in the production of a glass substrate for a small-diameter magnetic disk which is obtained by forming a cut line that draws a circular closed curve with a small radius. Consequently, from a practical point of view, for small magnetic disks with a size of 2.5 inches or less (in the case of 2.5 inches, the outer diameter is 65 mm and the inner diameter is 20 mm), which are often used for HDDs in mobile applications, glass substrates for magnetic disks which have high impact resistance and which enable higher recording density can be stably produced, thus being highly useful. Usability is high, preferably, for glass substrates for small magnetic disks with a size of 1.8 inches (outer diameter 48 mm, inner diameter 12 mm) or less, and more preferably, for glass substrates for small magnetic disks with an outer diameter of 30 mm or less, for example, with a size of 1.0 inch (outer diameter 27.4 mm, inner diameter 7 mm) or less.

Furthermore, the thickness of the glass substrate for a magnetic disk according to this embodiment is 1.5 mm or less, preferably 1.0 mm or less, and more preferably about 0.1 to 0.65 mm. In particular, in a magnetic disk composed of a thin substrate with a thickness of about 0.1 to 0.4 mm, which is difficult to cut, the glass substrate is highly useful and preferable.

By forming at least a magnetic layer on a substrate for a magnetic disk obtained according to this embodiment, it is possible to obtain a magnetic disk suitable for higher recording density. When a Co-based alloy magnetic layer having a hcp crystal structure is used as the magnetic layer, the coercive force (Hc) can be increased, and it is possible to contribute to higher recording density.

Furthermore, as necessary, an underlying layer is preferably formed between the substrate and the magnetic layer in order to control the crystal grains and orientation of the magnetic layer.

Additionally, when a magnetic disk is produced, preferably, at least a magnetic layer is formed, using a static facing-type film deposition method, by DC magnetron sputtering.

Furthermore, preferably, a protective layer is provided on the magnetic layer. By providing the protective layer, the surface of the magnetic disk can be protected from a magnetic recording head flying above the magnetic disk. As the material for the protective layer, for example, a carbon-based protective layer is suitably used. Furthermore, preferably, a lubricant layer is provided on the protective layer. By providing the lubricant layer, abrasion between the magnetic recording head and the magnetic disk can be prevented, and durability of the magnetic disk can be improved. As the material for the lubricant layer, for example, PFPE (perfluoropolyether) is preferable.

According to this embodiment, using a planar glass obtained by a float process, it is possible to stably produce a glass substrate used for a magnetic disk to be mounted in a Load Unload-type magnetic disk device which is advantageous for higher recording density. Furthermore, by producing a magnetic disk using a glass substrate for a magnetic disk obtained by the production method according to this embodiment, the production cost of the magnetic disk can be reduced because of high production yield of the glass substrate for a magnetic disk.

Example

The present invention will be described in detail below with reference to an example. However, it is to be understood that the present invention is not limited to the example described below.

A glass substrate for a magnetic disk in this example was produced through (1) cutting step, (2) shape-forming step, (3) grinding step, (4) end-face polishing step, (5) principal surface polishing step, and (6) chemically strengthening step, which are described below.

(1) Cutting Step (Cut-Out Step)

A planar amorphous glass material composed of an aluminosilicate glass with a thickness of 1 mm produced by a float process was prepared. A surface which came into contact with tin as a molten metal in the float forming is referred to as a bottom surface, and a surface opposite the bottom surface is referred to as a top surface.

With respect to both surfaces of the planar float glass material, surface waviness shape was observed using an Optiflat manufactured by Phase Shift Technology Inc. The measurement conditions are as follows:

1) Measurement region: toroidal region with an inner radius of 16 mm and an outer radius of 29 mm 2) Measurement area: 1,837 mm$^2$ 3) Selected shape wavelength: shape wavelength range of 0.1 to 5 mm As a result, in the bottom surface of the glass material, the maximum height of surface waviness (PV) was 40 nm. In the bottom surface of the glass material, the average height of surface waviness (Wa) was 4.5 nm. On the other hand, in the top surface of the glass material, the maximum height of surface waviness (PV) was 55 nm. In the top surface of the glass material, the average height of surface waviness (Wa) was 6.5 nm.

For comparison, using a stylus-type surface roughness tester, surface roughness was measured. As a result, it was not possible to observe a difference in the shape between the top surface and the bottom surface.

(1)-1 First Cutting Process

By cutting the planar float glass material with a cutter, many square glass plates are produced. As the cutter, a diamond cutter was used.

First, the bottom surface is selected from both surfaces of the prepared planar float glass material, and the diamond cutter is pressed against the bottom surface to form a cut line. In the cut line-forming step, the cut line was not allowed to reach the top surface, i.e., the opposing surface.

Specifically, the cut line was formed with the force for pressing a cutter blade being set such that the depth of the cut line was 50% of the thickness of the glass material.

Next, by splitting and bending the glass material provided with the cut line, the cut line is allowed to extend from the bottom surface to the top surface, i.e., the opposing surface, and a square glass plate is cut. By forming a plurality of cut lines, many square glass plates can be produced.

As described above, from one glass material, many glass plates were produced. The resulting glass plates are rectangular with a size of 50 to 100 mm in each of longitudinal and lateral directions. The case where a glass substrate of 75×75 mm was used will be described below.

(1)-2 Second Cutting Process

Next, circular cut lines were formed so as to extend along a substantial periphery of the outer peripheral side of the region in which a glass substrate for a magnetic disk was to be formed and a substantial periphery of the inner peripheral side, respectively, in the bottom surface of the glass plate, using a glass cutter. In this case, each of the outer peripheral side cut line and the inner peripheral side cut line was formed so as to be inclined outward with respect to the thickness direction. The inclination angle of each cut line with respect to the normal to the surface of the glass plate was set at about 10 degrees. Furthermore, the cut lines were formed with the force for pressing the cutter blade being set such that the depth of the cut lines was 50% of the thickness of the plate. Then, the bottom surface of the glass plate provided with the cut lines were entirely heated with a heater, the cut lines were allowed to extend to the top surface side of the planar glass, and a glass disk having a circular hole in the center was cut out.

(2) Shape-Forming Step

Next, the outer peripheral end face and the inner peripheral end face were subjected to grinding to set the outer diameter to 65 mmφ and the inner diameter (diameter of the circular hole in the center) to 20 mmφ, and then the outer peripheral end face and the inner peripheral end face were subjected to predetermined chamfering. In this stage, the surface roughness of the glass disk end face was about 4 μm in terms of Rmax. Note that, generally, in a 2.5-inch HDD (hard disk drive), a magnetic disk with an outer diameter of 65 mm is used.

(3) Grinding Step

Next, the surfaces of the glass disk were subjected to lapping with a double-sided lapping apparatus using alumina abrasive grains with a grain size of #1000. Thereby, the surface roughness was set to about 2 μm in terms of Rmax and about 0.2 μm in terms of Ra. The glass disk having undergone the lapping step was immersed in a cleaning tank containing a neutral detergent and a cleaning tank containing water in that order (under application of ultrasound) to perform ultrasonic cleaning.

(4) End-Face Polishing Step

Next, the surface roughness of the end faces (inner periphery and outer periphery) was polished to about 1 μm in terms of Rmax and about 0.3 μm in terms of Ra by brushing while the glass disk was being rotated. Then, the surfaces of the glass disk having undergone the end-face polishing were cleaned with water.

(5) Principal Surface Polishing Step

Next, a first polishing step for removing flaws and strain remaining from the lapping step was performed using a double-sided polishing apparatus. In the double-sided polishing apparatus, a glass disk held by a carrier is placed in close contact between upper and lower plates each provided with a polishing pad, the carrier is engaged with a sun gear and an internal gear, and the glass disk is clamped with the upper and lower plates.

Then, a polishing solution is supplied between the polishing pad and the surface to be polished of the glass disk and rotation is performed. Thereby, glass disk revolves while rotating on its own axis on the polishing plates, and its both surfaces are simultaneously polished. Specifically, the first polishing step was carried out using a hard polisher (rigid expanded urethane) as the polisher. The polishing was performed under the conditions where RO water in which cerium oxide (average grain size 1.3 μm) was dispersed as an abrasive was used as the polishing solution, and the polishing time was set at 15 minutes. The glass disk having undergone the first polishing step was immersed in cleaning tanks respectively containing a neutral detergent, pure water, pure water, IPA (isopropyl alcohol), and IPA (steam drying) in that order to perform ultrasonic cleaning, followed by drying.

Next, a second polishing step was performed using the same double-sided polishing apparatus as that used in the first polishing step, in which the polisher was changed to a polishing pad composed of a soft polisher (suede). The second polishing step is mirror polishing for the purpose of finishing on the principal surface of the glass disk to obtain a smooth mirror-like surface, for example, with a surface roughness of 8 nm or less in terms of Rmax while maintaining the smooth flat surface obtained in the first polishing step. The polishing was performed under the conditions where RO water in which cerium oxide (average grain size 0.8 μm) was dispersed was used as the polishing solution, and the polishing time was set at 5 minutes. The glass disk having undergone the second polishing step was immersed in cleaning tanks respectively containing a neutral detergent, pure water, pure water, IPA, and IPA (steam drying) in that order to perform ultrasonic cleaning, followed by drying.

(6) Chemically Strengthening Step

Next, the glass disk having undergone the cleaning was subjected to chemical strengthening. In the chemical strengthening, a chemically strengthening solution in which potassium nitrate and sodium nitrate were mixed was prepared, the chemically strengthening solution was heated to 380° C., and the cleaned and dried glass disk was immersed therein for about 4 hours to perform a chemically strengthening process. The glass disk having undergone the chemically strengthening was immersed in cleaning tanks respectively containing sulfuric acid, a neutral detergent, pure water, pure water, IPA, and IPA (steam drying) in that order to perform ultrasonic cleaning, followed by drying.

Furthermore, the surface roughness of the principal surface of the glass disk obtained through the individual steps described above was measured with an atomic force microscope (AFM). The result showed that the glass disk had an ultra-smooth surface in which Rmas=2.2 nm and Ra=0.2 nm. Furthermore, the resulting glass disk had an outer diameter of 65 mm, an inner diameter of 20 mm, and a thickness of 0.635 mm.

In such a manner, glass substrates for magnetic disks in this example was obtained. In both the first cutting process and the second cutting process, no glass plates after cutting had defects, such as cracks and flaws.

Next, each of the glass substrates for magnetic disks obtained in this example was subjected to a film deposition step, which will be described below, to produce a Load Unload-type magnetic disk.

Specifically, using a single-wafer sputtering apparatus, a seed layer, an underlying layer, a magnetic layer, a protective layer, and a lubricant layer were formed in that order on the glass substrate.

As the seed layer, a first seed layer composed of a CrTi thin film (thickness 30 nm) and a second seed layer composed of an AlRu thin film (thickness: 40 nm) were formed. The underlying layer was composed of a CrW thin film (thickness: 10 nm) and disposed so that a good crystal structure was provided to the magnetic layer. The compositional ratio of the CrW thin film was Cr: 90 at % and W: 10 at %.

The magnetic layer is composed of a CoPtCrB alloy and has a thickness of 20 nm. The contents of Co, Pt, Cr, and B in the magnetic layer are Co: 73 at %, Pt: 7 at %, Cr: 18 at %, and B: 2 at %. The protective layer is disposed so as to prevent the magnetic layer from being degraded by contact with a magnetic head. The protective layer is composed of hydrogenated carbon with a thickness of 5 nm, and wear resistance can be obtained. The lubricant layer is formed by a dipping method using a liquid lubricant composed of perfluoropolyether and has a thickness of 0.9 nm.

In such a manner, it was possible to produce glass substrates for magnetic disks and magnetic disks.

Comparative Example

In the example described above, in each of the first cutting process and the second cutting process, cutting lines were formed in the bottom surface. In contrast, in this comparative example, in each of the first cutting process and the second cutting process, cutting lines were formed in the top surface to cut glass plates.

The results in Example and Comparative Example are shown in Table 1 below. Note that the percent defective in Table 1 was obtained from data in the case where N=10000.

When comparison was made between Example and Comparative Example, in each of the first cutting process and the second cutting process, more cracks and flaws occurred in the side of the glass plate in Comparative Example than Example. As a result, in Comparative Example, the production efficiency decreased compared with Example.

Next, a method for producing a glass substrate for a magnetic disk according to another embodiment of the present invention will be described.

In the method for producing the glass substrate for a magnetic disk described above, it has been found that when a disk-shaped glass plate is cut from a planar glass material, in particular, when a small circle is cut (for example, when an inner hole (inner diameter) is formed rather than when an outer diameter of a disk-shaped glass plate is formed), many defective products are produced. It has also been found that when a small-radius circle is cut out, depending on the magnitude of surface waviness of the glass material and the radius of the circle of the cut line formed, the non-defective ratio varies. For example, it has been found that in the case where an inner hole (inner diameter) having a relatively small radius is formed compared with the case where an outer diameter of a disk-shaped glass plate is formed, the non-defective ratio improves by forming a cut line on a surface having small surface waviness in which the surface waviness at a specific surface waviness is a predetermined value or less out of two opposing surfaces of the glass material.

When a disk-shaped glass plate is cut from a planar glass material, a cutter blade is pressed against the planar glass material to form a cut line. In such a case, when a circular cut line with a small radius is formed, the cut line is formed through many surface wavinesses. At this time, many changes are occurring in the force applied to the cutter blade and the force applied to the glass material. As a result, wear of the cutter blade is accelerated, or chips and cracks occur in the cut disk-shaped glass plate.

When a circle with a small radius is cut out, in consideration of such a correlation between the radius of the circular cut line to be formed and the surface waviness of the planar glass material, a planar glass material having surface waviness with a specific wavelength is selected. Alternatively, the cut line is formed on a surface having relatively small surface waviness out of two opposing surfaces of the glass material. Thereby, it is possible to improve the non-defective product ratio of the disk-shaped glass plate cut from the planar glass material.

That is, it is obvious that, in the case where the radius of a circular cut line to be formed is small, the percent defective increases when the cut line is formed on a surface having large surface waviness and then cutting is performed, and the percent defective decreases when the cut line is formed on a surface having small surface waviness and then cutting is performed.

TABLE 1

| | Cut line-forming surface | Surface waviness | | Cutter life [sheets] | | Percent defective (%) | |
|---|---|---|---|---|---|---|---|
| | | Maximum height PV [nm] | Average height Ra [nm] | Cutting | Coring (radius 9 mm) | Cutting | Coring (radius 9 mm) |
| Example | Bottom surface | 40 | 4.5 | 31074 | 26278 | 0.03 | 0.23 |
| Comparative Example | Top surface | 55 | 6.5 | 24362 | 21054 | 0.35 | 2.3 |

As described above, when the radius of the circular cut line is small, the influence of the surface waviness on the planar glass material relatively increases. Therefore, it is evident that surface waviness greatly affects the coring step. It is also evident that, even in the case of the same surface waviness, the percent defective is higher when the radius of the circular cut line is small than when the radius is large.

For the above-described reason, when a circular cut line is formed in a glass material and then cutting is performed, preferably, cutting is performed under the conditions where the radius of the circle (r [mm]) and the maximum height of surface waviness (PV [nm]) of the glass material satisfy a predetermined relationship, for example, PV≤5×r. Note that it is obvious that in the relationship between the maximum height (PV) expressed by nm and the radius r expressed by mm, comparison is made excluding the units. Specifically, if the radius r is 10 mm, the maximum height of surface waviness PV is 50 nm or less.

Furthermore, when a circle with a predetermined radius or less is cut out by forming a cut line, a method may be used in which the maximum height of surface waviness of a glass material is measured, a glass material having a predetermined maximum height of surface waviness or less is selected, and then the circle is cut out. For example, the glass material is selected such that the maximum height of surface waviness PV [mn] satisfies the relationship PV 5×r, wherein r [nm] is the radius of a circle to be cut.

The fact that when a small-diameter disk is cut, waviness of a cut surface on which a cut line is to be formed has a strong influence, and by forming the cut line such that the radius of the circle to be cut and the waviness satisfy a specific relationship, the non-defective product ratio can be improved will be described below with reference to actual experimental results.

Specifically, glass materials having different maximum heights of surface waviness were prepared, and the coring step (second cutting process) was performed with the cutting radius (radius of cut line to be formed) being variously changed. In this case, the force for pressing a cutter blade is set such that the depth of the cut line is 50% of the thickness of the plate. The results thereof are shown in Table 2.

TABLE 2

| | Cutting radius (mm) | Waviness | | Percent defective (%) | Thickness (mm) |
| --- | --- | --- | --- | --- | --- |
| | | Waviness of cut surface (surface in which cut line is formed) | Waviness of non-cut surface (back side) | | |
| Sample 1 | 9 | 40 nm | 59 nm | 0.23 | 0.95 |
| Comparative Sample 1 | 9 | 59 nm | 40 nm | 2.30 | 0.95 |
| Reference Sample | 33 | 40 nm | 59 nm | 0.30 | 0.95 |
| Reference Sample | 33 | 59 nm | 40 nm | 0.30 | 0.95 |

With respect to the determination of non-defective and defective products, end faces of the cut glass materials were visually observed, and those having chips, cracks, and fractures were considered to be defective products. Furthermore, those which were fractured during cutting were also considered to be defective products. Note that the percent defective in the above table was obtained in the case where N=10000.

As is evident from the results (Sample and Comparative Sample), when a small-diameter disk is cut out, the waviness of the cut surface in which the cut line is formed has a strong influence.

The results show that there is almost no difference in the percent defective between the case where the radius is 9 mm and the case where the radius is 33 mm. However, the results shown are on a disk basis. The distance scanned by the cutter in the case where the radius is 33 mm is 2.7 times that in the case where the radius is 9 mm. Consequently, the percent defective on the basis of distance scanned by the cutter in the case where the radius is 9 mm is 2.7 or more times that in the case where the radius is 33 mm.

Furthermore, as is evident from Reference Samples, when the cutting radius is large, small waviness does not have a substantial influence.

Furthermore, Table 3 shows the percent defective when each of the cutting radius and the waviness of the cut surface was changed.

TABLE 3

| | Cutting radius (mm) | Waviness of cut surface (nm) | Percent defective (%) | Waviness/radius ratio (*10$^{-6}$) |
| --- | --- | --- | --- | --- |
| Sample 1 | 9 | 40 | 0.23 | 4.44 |
| Sample 2 | 6 | 20 | 0.25 | 3.33 |
| Sample 3 | 3.5 | 10 | 0.27 | 2.86 |
| Comparative Sample 1 | 9 | 59 | 2.30 | 6.56 |
| Comparative Sample 2 | 6 | 50 | 3.32 | 8.33 |
| Comparative Sample 3 | 3.5 | 40 | 3.56 | 11.43 |

Figure 4:
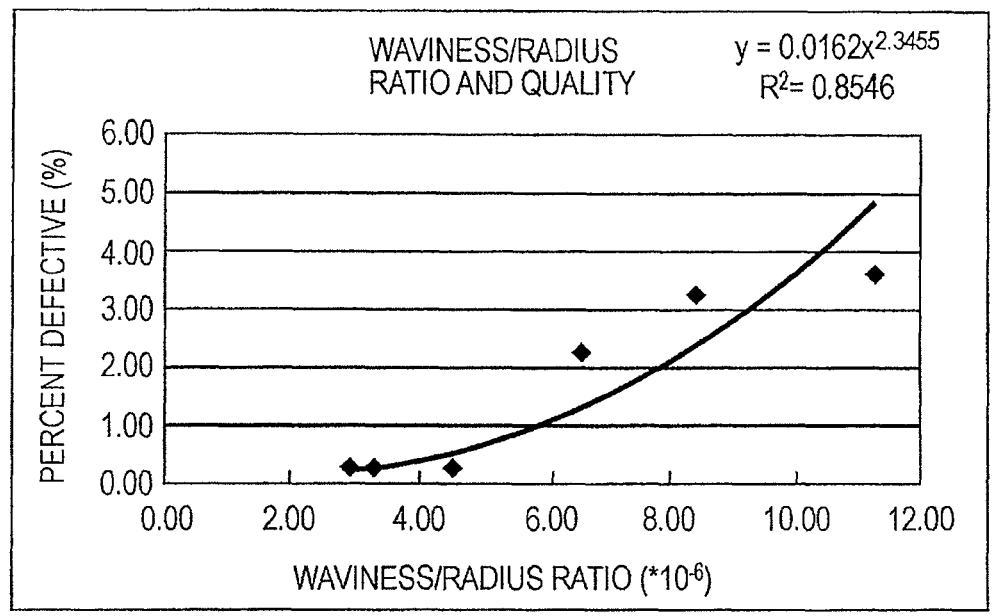
FIG. 4 is a graph showing a relationship between the waviness/radius ratio and the percent defective in planar glasses.

FIG. 4 shows the results where the relationship between the waviness/radius ratio and the percent defective shown in Table 3 is plotted. As is evident from the results, for example, when the cutting radius is small, such as at 10 mm, the quality degradation is large, and thus there is a correlation between the quality and the ratio of the cutting radius to the maximum height of surface waviness of the glass material in which the cut line is formed.

Furthermore, in this embodiment, the cut lines 2 and 3 are formed so as to incline outward from the bottom surface 1A of the planar glass 1 toward the top surface 1B side. However, the method is not limited thereto. For example, a method may be used in which cut lines 2 and 3 are formed so as to incline inward from the bottom surface 1A of the planar glass 1 toward the top surface 1B side, such that in a cross-sectional view as that shown in FIG. 1(b), the left and right cut lines 2 and the left and right cut lines 3 each are formed so as to correspond to sides of a truncated inverse pyramid, the cut lines are allowed to extend, and the inner portions surrounded by the cut lines are taken out upward.

Furthermore, in this embodiment, the cut line is a closed curve extending along a substantial periphery of a region in which a glass substrate for a magnetic disk is to be formed. However, the cut line may not be a completely closed curve. For example, even in the case where the start point of a cut line and the end point slightly deviate from each other, it is possible to allow the cut line to extend and to cut out a disk-shaped glass substrate. Furthermore, the cut line may not be a continuous curve. For example, it may be possible to use a method in which a cut line is formed in the shape of a broken line so as to extend along a substantial periphery of a region in which a glass substrate for a magnetic disk is to be formed, the cut line is allowed to extend, and a disk-shaped substrate is cut out.

In order to achieve a higher recording density of a magnetic disk, it is necessary to improve the smoothness of the surface of a glass substrate. A glass substrate for a magnetic disk is produced by grinding and polishing the surface of a glass disk 10 with a predetermined size cut from a planar glass obtained by the float process as described above. Usually, the grinding step is performed using a lapping apparatus, and in order to improve the dimensional accuracy and form accuracy of the glass disk 10, abrasive grains having a predetermined grain size are used. Furthermore, the polishing step is performed using a polishing apparatus. In a preferred embodiment, a first polishing step and a second polishing step are carried out. In the first polishing step, in order to remove flaws and strain remaining from the grinding step, the surface of the glass substrate is polished using a hard polisher as the polisher, and in the second polishing step, in order to perform finishing to obtain a smoother mirror-like surface while maintaining the flat surface obtained in the first polishing step, the surface of the glass disk is polished using a soft polisher in place of the hard polisher.

Furthermore, the glass substrate which has undergone the polishing step may be subjected to chemical strengthening. In particular, when the type of glass used is an aluminosilicate glass, by performing chemical strengthening, the flexural strength is increased, the depth of a compressive stress layer is increased, and excellent Knoop hardness is obtained. The method for chemical strengthening is not particularly limited, and any conventionally known method may be used. From a practical point of view, chemical strengthening by a low-temperature ion exchange method is preferable.

Furthermore, a texture for imparting magnetic anisotropy to a magnetic layer to be formed on the glass substrate may be formed on the principal surface of the glass substrate. One example of the method for forming such a texture is a method using tape polishing, in which a tape is pressed against the principal surface of the glass substrate, and by relatively moving the glass substrate and the tape with a polishing solution being supplied, a circumferential texture can be formed on the principal surface of the glass substrate.

In this embodiment, although the diameter of the glass substrate for a magnetic disk is not particularly limited, a more significant effect is shown in the production of a glass substrate for a small-diameter magnetic disk which is obtained by forming a cut line that draws a circular closed curve with a small radius. Consequently, from a practical point of view, for small magnetic disks with a size of 2.5 inches or less (in the case of 2.5 inches, the outer diameter is 65 mm and the inner diameter is 20 mm), which are often used for HDDs in mobile applications, glass substrates for magnetic disks which have high impact resistance and which enable higher recording density can be stably produced, thus being highly useful. Usability is high, preferably, for glass substrates for small magnetic disks with a size of 1.8 inches (outer diameter 48 mm, inner diameter 12 mm) or less, and more preferably, for glass substrates for small magnetic disks with an outer diameter of 30 mm or less, for example, with a size of 1.0 inch (outer diameter 27.4 mm, inner diameter 7 mm) or less.

Furthermore, the thickness of the glass substrate for a magnetic disk according to this embodiment is 1.5 mm or less, preferably 1.0 mm or less, and more preferably about 0.1 to 0.65 mm. In particular, in a magnetic disk composed of a thin substrate with a thickness of about 0.1 to 0.4 mm, which is difficult to cut, the glass substrate is highly useful and preferable.

In the method for producing a glass substrate for a magnetic disk, when a disk-shaped glass plate is cut from a planar glass material, in particular, when a disk-shaped glass plate is cut from a planar glass material with a small thickness, in many cases, many non-defective products are produced. When a glass plate is cut from such a glass material with a small plate thickness, the non-defective product ratio varies depending on the correlation between the magnitude of surface waviness of the glass material and the thickness of the glass material.

In consideration of such a correlation between the thickness of the planar glass material and the magnitude of surface waviness, when a disk-shaped glass plate is cut from a glass material with a small plate thickness, a planar glass material having surface waviness with a specific wavelength is selected and cut out, or a cut line is formed on a surface having relatively small surface waviness out of two opposing surfaces of the glass material. Thereby, it is possible to improve the non-defective product ratio of the disk-shaped glass plate cut from the planar glass material.

That is, it is obvious that, in the case where the thickness of a planar glass material is small, the percent defective increases when a cut line is formed on a surface having large surface waviness and then cutting is performed, and the percent defective decreases when a cut line is formed on a surface having small surface waviness and then cutting is performed.

As described above, when the glass material is a thin plate, the ratio of surface waviness to the thickness relatively increases. Therefore, it is evident that surface waviness greatly affects the coring step. It is also evident that, even in the case of the same surface waviness, the percent defective is higher when the glass material is a thin plate than when the glass material is a thick plate.

Consequently, when a thin glass plate is cut out, by selecting a surface having small surface waviness, the non-defective ratio can be improved. That is, in the case where a thin glass plate is cut from a glass material, since surface waviness strongly affects the thickness, by selecting a surface having small surface waviness in the glass material or by selecting a surface having relatively small surface waviness out of two opposing surfaces of the glass material, and by forming a cut line, a non-defective product can be obtained efficiently.

On the basis of the fact described above, an experiment was carried out. As a result, it was found that when a thin glass plate is cut out, it is preferable to perform cutting under the conditions where the thickness (t [mm]) of the glass material and the maximum height of surface waviness (PV [nm]) of the glass material satisfy a predetermined relationship, for example, PV≤50t. For example, if the thickness t is 1 mm, the maximum height of surface waviness PV is 50 nm or less.

Furthermore, when a glass material having a predetermined thickness or less is cut out, a method may be used in which the maximum height of surface waviness of a glass material is measured, a glass material having a predetermined maximum height of surface waviness or less is selected, and then a cut line is formed. For example, assuming that the thickness of glass material is t [mm], a glass material is selected so that the maximum height of surface waviness PV [nm] satisfies the relationship PV≤50t.

The fact that when a thin planar disk is cut out, waviness of a cut surface on which a cut line is to be formed has a strong influence, and by forming the cut line such that the thickness of a glass material to be cut and the surface waviness of the cut surface satisfy a specific relationship, the non-defective product ratio can be improved will be described below with reference to actual experimental results.

Specifically, glass materials having different maximum heights of surface waviness and different thicknesses were prepared, and the coring step (second cutting process) was performed. In this case, the force for pressing a cutter blade is set such that the depth of the cut line is 50% of the thickness of the plate. The results thereof are shown in Table 4.

TABLE 4

| | | Waviness | | | |
|---|---|---|---|---|---|
| | | Waviness of cut | | Percent defective in coring (%) | |
| | Thickness (mm) | surface (surface in which cut line is formed) | of non-cut surface (back side) | ID (radius 9 mm) | OD (radius 33 mm) |
| Sample 4 | 0.95 | 40 nm | 59 nm | 0.23 | 0.30 |
| Comparative Sample 4 | 0.95 | 59 nm | 40 nm | 2.30 | 2.45 |
| Sample 5 | 1.31 | 40 nm | 59 nm | 0.21 | 0.29 |
| Comparative Sample 5 | 1.31 | 59 nm | 40 nm | 2.53 | 2.54 |
| Reference Sample | 10 | 40 nm | 59 nm | 0.22 | 0.21 |
| Reference Sample | 10 | 59 nm | 40 nm | 0.21 | 0.22 |

In Table 4, ID represents a radius of an inner hole formed in a glass disk, and OD represents a radius of an external (outer circle). Furthermore, the percent defective in coring was obtained in the case where N=10000.

As is evident from the results, when a glass substrate is cut from a thin plate, the waviness of the cut surface in which the cut line is formed has a strong influence.

Furthermore, Reference Samples show that when the waviness is small relative to the thickness, the waviness does not substantially influence the results.

Furthermore, Table 5 shows the percent defective when each of the thickness and the waviness of the surface on which the cut line was formed (waviness of cut surface) was changed.

TABLE 5

| | Thickness (mm) | Waviness of cut surface (nm) | Percent defective (%) | Waviness/thickness ratio (*$10^{-6}$) |
|---|---|---|---|---|
| Sample 4 | 0.95 | 40 | 0.30 | 42.11 |
| Sample 5 | 1.31 | 40 | 0.29 | 30.53 |
| Sample 6 | 0.50 | 20 | 0.27 | 40.00 |
| Comparative Sample 4 | 0.95 | 59 | 2.30 | 62.11 |
| Comparative Sample 5 | 1.31 | 75 | 3.32 | 57.25 |
| Comparative Sample 6 | 0.50 | 40 | 3.56 | 80.00 |

Figure 5:
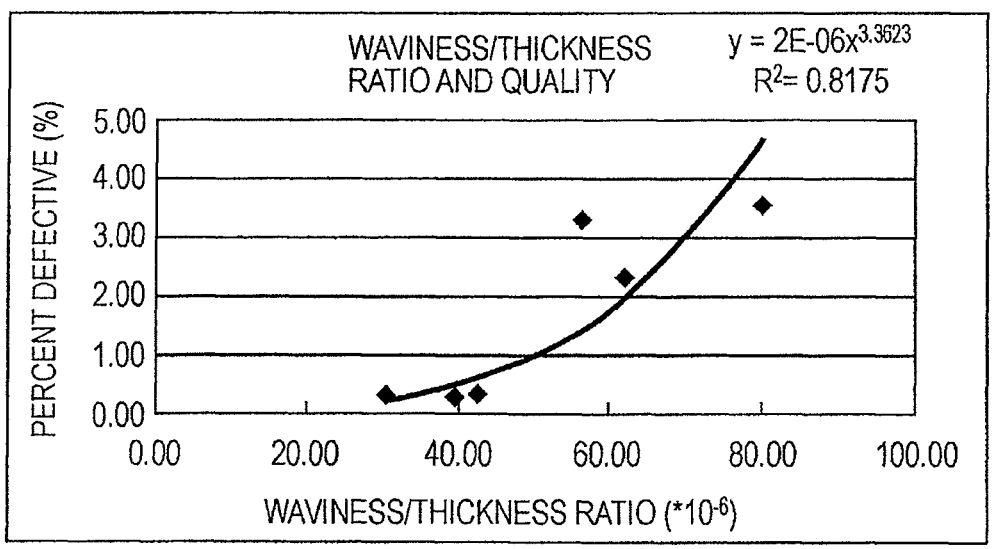
FIG. 5 is a graph showing a relationship between the waviness/thickness ratio and the percent defective in planar glasses.

FIG. 5 shows the results where the relationship between the waviness/thickness ratio and the percent defective in this case is plotted. As is evident from the results, in the case of a thin glass material, for example, with a thickness of 1.5 mm, there is a correlation between the thickness and the maximum height of surface waviness of the glass material on which a cut line is formed.

Furthermore, the same experiment was carried out when the depth of the cut line formed in the glass material was changed from 50% to 85% of the glass material. The results thereof showed the similar tendency to that described above.

By forming at least a magnetic layer on a substrate for a magnetic disk obtained according to this embodiment, it is possible to obtain a magnetic disk suitable for higher recording density. When a Co-based alloy magnetic layer having a hcp crystal structure is used as the magnetic layer, the coercive force (Hc) can be increased, and it is possible to contribute to higher recording density.

Furthermore, as necessary, an underlying layer is preferably formed between the substrate and the magnetic layer in order to control the crystal grains and orientation of the magnetic layer.

Additionally, when a magnetic disk is produced, preferably, at least a magnetic layer is formed, using a static facing-type film deposition method, by DC magnetron sputtering.

Furthermore, preferably, a protective layer is provided on the magnetic layer. By providing the protective layer, the surface of the magnetic disk can be protected from a magnetic recording head flying above the magnetic disk. As the material for the protective layer, for example, a carbon-based protective layer is suitably used. Furthermore, preferably, a lubricant layer is provided on the protective layer. By providing the lubricant layer, abrasion between the magnetic recording head and the magnetic disk can be prevented, and durability of the magnetic disk can be improved. As the material for the lubricant layer, for example, PFPE (perfluoropolyether) is preferable.

According to this embodiment, using a planar glass, it is possible to stably produce a glass substrate used for a magnetic disk to be mounted in a Load Unload-type magnetic disk device which is advantageous for higher recording density. Furthermore, by producing a magnetic disk using a glass substrate for a magnetic disk obtained by the production method according to this embodiment, the production cost of the magnetic disk can be reduced because of high production yield of the glass substrate for a magnetic disk.

The embodiments and examples of the present invention have been described above.

In the embodiments and examples, the case where a glass material formed by the float process is used has been described as an example. However, it is not always necessary to limit the present invention to the case where a glass material formed by the float process is used. For example, a glass material formed into a planar shape by a down-draw process, a glass material formed into a planar shape by a fusion process, or a glass material formed into a planar shape by a press process may also be used.

Furthermore, in still another embodiment of the present invention, when a thin glass plate is cut out, cutting is performed under the conditions where the thickness (t [mm]) of a glass material and the maximum height of surface waviness (PV [nm]) of the glass material satisfy a predetermined relationship, for example, PV≤50t. That is, it has been found that, in a preferred embodiment, for example, if the thickness t is 1 mm, the maximum height of surface waviness PV is 50 nm or less.

Experiments have confirmed that when a glass material having a predetermined thickness or less is cut out, a method may be used in which the maximum height of surface waviness of a glass material is measured, a glass material having a predetermined maximum height of surface waviness or less is selected, and then a cut line is formed. For example, assuming that the thickness of glass material is t [mm], a glass material is selected so that the maximum height of surface waviness PV [nm] satisfies the relationship PV≤50t.

By forming at least a magnetic layer on a substrate for a magnetic disk obtained according to this embodiment, it is possible to obtain a magnetic disk suitable for higher recording density. When a Co-based alloy magnetic layer having a hcp crystal structure is used as the magnetic layer, the coercive force (Hc) can be increased, and it is possible to contribute to higher recording density.

Furthermore, as necessary, an underlying layer is preferably formed between the substrate and the magnetic layer in order to control the crystal grains and orientation of the magnetic layer.

Additionally, when a magnetic disk is produced, preferably, at least a magnetic layer is formed, using a static facing-type film deposition method, by DC magnetron sputtering.

Furthermore, preferably, a protective layer is provided on the magnetic layer. By providing the protective layer, the surface of the magnetic disk can be protected from a magnetic recording head flying above the magnetic disk. As the material for the protective layer, for example, a carbon-based protective layer is suitably used. Furthermore, preferably, a lubricant layer is provided on the protective layer. By providing the lubricant layer, abrasion between the magnetic recording head and the magnetic disk can be prevented, and durability of the magnetic disk can be improved. As the material for the lubricant layer, for example, PFPE (perfluoropolyether) is preferable.

According to this embodiment, using a planar glass, it is possible to stably produce a glass substrate used for a magnetic disk to be mounted in a Load Unload-type magnetic disk device which is advantageous for higher recording density. Furthermore, by producing a magnetic disk using a glass substrate for a magnetic disk obtained by the production method according to this embodiment, the production cost of the magnetic disk can be reduced because of high production yield of the glass substrate for a magnetic disk.

Next, a Load Unload-type magnetic disk was produced by subjecting a glass substrate for a magnetic disk obtained as described above to a film deposition step, which will be described below.

Specifically, using a single-wafer sputtering apparatus, a seed layer, an underlying layer, a magnetic layer, a protective layer, and a lubricant layer were formed in that order on the glass substrate.

As the seed layer, a first seed layer composed of a CrTi thin film (thickness 30 nm) and a second seed layer composed of an AlRu thin film (thickness: 40 nm) were formed. The underlying layer was composed of a CrW thin film (thickness: 10 nm) and disposed so that a good crystal structure was provided to the magnetic layer. The compositional ratio of the CrW thin film was Cr: 90 at % and W: 10 at %.

The magnetic layer is composed of a CoPtCrB alloy and has a thickness of 20 nm. The contents of Co, Pt, Cr, and B in the magnetic layer are Co: 73 at %, Pt: 7 at %, Cr: 18 at %, and B: 2 at %. The protective layer is disposed so as to prevent the magnetic layer from being degraded by contact with a magnetic head. The protective layer is composed of hydrogenated carbon with a thickness of 5 nm, and wear resistance can be obtained. The lubricant layer is formed by a dipping method using a liquid lubricant composed of perfluoropolyether and has a thickness of 0.9 nm.

In such a manner, it was possible to produce a glass substrate for a magnetic disk and a magnetic disk.

Examples/Comparative Examples

Next, glass materials having different maximum heights of surface waviness and different thicknesses were prepared. A coring step (second cutting process) was performed, and the relationship between the maximum height of surface waviness and the thickness was examined. In this case, the force for pressing a cutter blade is set such that the depth of the cut line is 50% of the thickness of the plate. The results thereof are shown in Tables 6 and 7. In the tables, ID represents a radius of an inner hole formed in a glass disk, and OD represents a radius of an external (outer circle).

TABLE 6

| | | Waviness | | | |
|---|---|---|---|---|---|
| | | Waviness of cut surface (surface in which cut line is formed) | Waviness of non-cut surface (back side) | Percent defective in coring (%) | |
| | Thickness (mm) | | | ID (radius 9 mm) | OD (radius 33 mm) |
| Example 1 | 0.95 | 40 nm | 59 nm | 0.23 | 0.30 |
| Comparative Example 1 | 0.95 | 59 nm | 40 nm | 2.30 | 2.45 |
| Example 2 | 1.31 | 40 nm | 59 nm | 0.21 | 0.29 |
| Comparative Example 2 | 1.31 | 59 nm | 40 nm | 2.53 | 2.54 |
| Reference Example | 10 | 40 nm | 59 nm | 0.22 | 0.21 |
| Reference Example | 10 | 59 nm | 40 nm | 0.21 | 0.22 |

Here, the percent defective in coring corresponds to the percent defective in the second cutting process, and is the value in the case where N=10000. Furthermore, with respect to the determination of non-defective and defective products, end faces of the cut glass materials were visually observed, and those having chips, cracks, and fractures were considered to be defective products. Furthermore, those which were fractured during cutting were also considered to be defective products.

As is evident from the results, when a glass substrate is cut from a thin plate, the waviness of the cut surface in which the cut line is formed has a strong influence.

Furthermore, Reference Examples show that when the waviness is small relative to the thickness, the waviness does not substantially influence the results.

Furthermore, Table 7 shows the percent defective when each of the thickness and the waviness of the surface on which the cut line was formed (waviness of cut surface) was changed.

TABLE 7

| | Thickness (mm) | Waviness of cut surface (nm) | Percent defective (%) | Waviness/thickness ratio ($*10^{-6}$) |
|---|---|---|---|---|
| Example 1 | 0.95 | 40 | 0.30 | 42.11 |
| Example 2 | 1.31 | 40 | 0.29 | 30.53 |
| Example 3 | 0.50 | 20 | 0.27 | 40.00 |
| Comparative Example 1 | 0.95 | 59 | 2.30 | 62.11 |
| Comparative Example 2 | 1.31 | 75 | 3.32 | 57.25 |
| Comparative Example 3 | 0.50 | 40 | 3.56 | 80.00 |

FIG. 4 shows the results where the relationship between the waviness/thickness ratio and the percent defective in this case is plotted. As is evident from the results, in the case of a thin glass material, for example, with a thickness of 1.5 mm, there is a correlation between the quality and the ratio between the thickness and the maximum height of surface waviness of the glass material on which a cut line is formed.

Furthermore, the same experiment was carried out when the depth of the cut line formed in the glass material was changed from 50% to 85% of the glass material. The results thereof showed the similar tendency to that described above.

In the embodiments and examples, the case where a glass material formed by the float process is used has been described as an example. However, it is not always necessary to limit the present invention to the case where a glass material formed by the float process is used. For example, a glass material formed into a planar shape by a down-draw process, a glass material formed into a planar shape by a fusion process, or a glass material formed into a planar shape by a press process may also be used.

INDUSTRIAL APPLICABILITY

According to the present invention, it is possible to produce a glass substrate suitable for producing a magnetic disk for high-density recording, the glass substrate being free from chips, flaws, cracks, and the like in its side.

The invention claimed is:

1. A method for producing a glass substrate for a magnetic disk comprising:
   forming a cut line in a circular shape in one surface of a planar glass material so as to draw a curve extending along a substantial periphery of a region in which a glass substrate for a magnetic disk is to be formed; and
   allowing the cut line to extend in a thickness direction of the glass material, thereby cutting a disk-shaped glass plate; and making the glass substrate for the magnetic disk from the cut glass plate,
   wherein, when the cut line in the circular shape is formed in the glass material and then cutting is performed, the cutting is performed under the conditions where the radius of the circle (r [mm]) and a maximum height of a surface waviness (PV [nm]) of the glass material satisfy a predetermined relationship;
   wherein the predetermined relationship is $PV \leq 5 \times r$;
   wherein the surface waviness of the one surface falls within a waviness wavelength band between 0.1 mm and 5 mm; and
   wherein the cut line has a radius not greater than 10 mm.

2. A method for producing a glass substrate for a magnetic disk, comprising:
   measuring each surface waviness of one surface and an other surface opposite to the one surface to select, as a selected surface, the one surface which is small in surface waviness relative to the other surface;
   forming a cut line in the selected surface;
   extending the cut line in a thickness direction of the glass material; and
   cutting the glass material into the glass substrate;
   wherein a circle with a radius of 10 mm or less is cut out by forming the cut line in the selected surface.

3. The method for producing a glass substrate for a magnetic disk according to claim 2, wherein the cut line is formed in the selected surface with a maximum height of surface waviness of 50 nm or less.

4. A method for producing a glass substrate for a magnetic disk comprising:
   forming a cut line in one surface of a planar glass material so as to draw a circle extending along a substantial periphery of a region in which a glass substrate for a magnetic disk is to be formed;
   allowing the cut line to extend in a thickness direction of the glass material, thereby cutting a disk-shaped glass plate; and
   making the glass substrate for the magnetic disk from the cut glass plate,
   wherein, when the circle, which has a radius not greater than 10 mm, is cut out by forming the cut line, a maximum height of surface waviness of the glass material is measured on the one surface, the one surface of the glass material having a predetermined maximum height of surface waviness is selected, and then the circle is cut out;
   wherein a glass material satisfying a relationship $PV \leq 5 \times r$ is selected, wherein r [nm] is a radius of the circle, and PV [nm] is the maximum height of surface waviness; and
   wherein the surface waviness of the one surface falls within a waviness wavelength band between 0.1 mm and 5 mm.

5. The method for producing a glass substrate for a magnetic disk according to claim 1, wherein the cut line of the circular shape is formed so as to incline with respect to the thickness direction of the glass material and is extended with an inclination angle in the thickness direction.

6. A method for producing a magnetic disk comprising forming at least a magnetic layer on a glass substrate produced by the method for producing a glass substrate for a magnetic disk according to claim 1.

7. A method for producing a glass substrate for a magnetic disk comprising forming a cut line in one surface of a planar glass material so as to draw a closed curve extending along a substantial periphery of a region in which a glass substrate for a magnetic disk is to be formed; allowing the cut line to extend in the thickness direction of the glass material, thereby cutting a disk-shaped glass plate; and making the glass substrate for the magnetic disk from the cut glass plate,
   wherein cutting is performed under the conditions where the thickness (t [mm]) of the glass material and the maximum height of surface waviness (PV [nm]) of the glass material satisfy a predetermined relationship;
   wherein the predetermined relationship is $PV \leq 50t$;
   wherein the surface waviness of the one surface falls within a waviness wavelength band between 0.1 mm and 5 mm; and
   wherein the thickness of the glass material is not thicker than 1.5 mm.

8. A method for producing a glass substrate for a magnetic disk comprising forming a cut line in one surface of a planar glass material so as to draw a curve extending along a substantial periphery of a region in which a glass substrate for a magnetic disk is to be formed; allowing the cut line to extend in the thickness direction of the glass material, thereby cutting a disk-shaped glass plate; and making the glass substrate for the magnetic disk from the cut glass plate,
   comprising:
   measuring a surface waviness on two opposing surfaces of the glass material which has a thickness of 1 mm or less; and
   selecting, as a selected surface, the one of the surfaces which is small in the surface waviness as compared with the other surface;
   wherein, when the disk-shaped glass plate is cut from the glass material, the cut line is formed in the selected surface.

9. The method for producing a glass substrate for a magnetic disk according to claim 8, wherein, when the disk-shaped glass plate is cut from a glass material with a thickness of 1 mm, the cut line is formed in the selected surface with a maximum height of surface waviness of 50 nm or less.

10. A method for producing a glass substrate for a magnetic disk comprising forming a cut line in one surface of a planar glass material so as to draw a curve extending along a substantial periphery of a region in which a glass substrate for a magnetic disk is to be formed; allowing the cut line to extend in the thickness direction of the glass material, thereby cutting a glass plate; and making the glass substrate for the magnetic disk from the cut glass plate, wherein, when the planar glass material with a predetermined thickness is cut, a maximum height of surface waviness of the glass material is measured on the one surface of the planar glass material, the measured glass material having a predetermined maximum height of surface waviness on the one surface is selected, and then the cut line is formed in the one surface of the planar glass material; and wherein the one surface of the measured planar glass material satisfying a relationship PV≤50t is selected, wherein t [mm] is the thickness, and PV [nm] is the maximum height of surface waviness;

wherein the surface waviness of the one surface falls within a waviness wavelength band between 0.1 mm and 5 mm; and wherein the thickness of the glass material is not thicker than 1.5 mm.

11. The method for producing a glass substrate for a magnetic disk according to claim 7, wherein the cut line is formed so as to incline with respect to the thickness direction of the glass material and so as to draw the closed curve and is extended with an inclination angle in the thickness direction.

12. A method for producing a magnetic disk comprising forming at least a magnetic layer on a glass substrate produced by the method for producing a glass substrate for a magnetic disk according to claim 7.

13. The method for producing a glass substrate for a magnetic disk according to claim 1, wherein the glass material contains $SiO_2$, $Al_2O_3$, and $Na_2O$.

14. The method for producing a glass substrate for a magnetic disk according to claim 10, wherein the one surface of the planar glass material is specified by an average height of the surface waviness within the waviness wavelength band between 0.1 mm and 5 mm and the average height is not greater than 5 nm.

15. The method for producing a glass substrate for a magnetic disk according to claim 10, wherein the cut line has a depth which is in a range of 50% and 85% of the thickness of the planar glass material.

16. The method for producing a glass substrate for a magnetic disk according to claim 10, wherein the cut line is extended in the thickness direction of the glass material during a thermal treatment from the one surface towards another surface opposite to the one surface, wherein the thermal treatment is performed so that a thermal expansion difference is caused to occur in the glass material.

17. The method for producing a glass substrate for a magnetic disk according to claim 10, wherein the cut line is formed obliquely with respect to the thickness direction.

* * * * *

UNITED STATES PATENT AND TRADEMARK OFFICE
CERTIFICATE OF CORRECTION

PATENT NO. : 8,715,777 B2  
APPLICATION NO. : 13/459337  
DATED : May 6, 2014  
INVENTOR(S) : Joseph Marquez and Elmer Mahia Page 1 of 1

It is certified that error appears in the above-identified patent and that said Letters Patent is hereby corrected as shown below:

On the Title Page, Item [73],

"(73) Assignee: Hoya Corporation, Tokyo (JP)", should be

-- (73) Assignee: Hoya Corporation, Tokyo (JP); Hoya Glass Disk Philippines, Inc., Laguna (PH). --.

Signed and Sealed this  
Fifth Day of May, 2015

Michelle K. Lee  
*Director of the United States Patent and Trademark Office*